Dec. 22, 1925.  
J. E. TAYLOR  
1,566,633

DEVICE FOR PREVENTING GREASE LEAKAGE IN AXLE BEARINGS

Filed July 27, 1923

J. E. TAYLOR.
INVENTOR

BY *Lacey & Lacey*
ATTORNEYS

Patented Dec. 22, 1925.

1,566,633

UNITED STATES PATENT OFFICE.

JAMES E. TAYLOR, OF DALLAS, TEXAS.

DEVICE FOR PREVENTING GREASE LEAKAGE IN AXLE BEARINGS.

Application filed July 27, 1923. Serial No. 654,187.

*To all whom it may concern:*

Be it known that I, JAMES E. TAYLOR, a citizen of the United States, residing at Dallas, in the county of Dallas and State of Texas, have invented certain new and useful Improvements in Devices for Preventing Grease Leakage in Axle Bearings, of which the following is a specification.

The present invention relates to a device for preventing grease leakage in axle bearings and is mainly intended for use on the rear axles of motor vehicles, and more particularly for the rear axles of Ford automobiles.

This device consists of a system of washers and collars placed around the axle shaft in such a manner that grease or other lubricant furnished for the driving gears and the roller bearings cannot pass out of the housing during the operation of the vehicle, but is retained therein, in this manner preventing waste of grease or lubricant and causing the owner of the vehicle a considerable saving in all such material.

In the accompanying drawing, one embodiment of the invention is illustrated; and—

Figure 1:
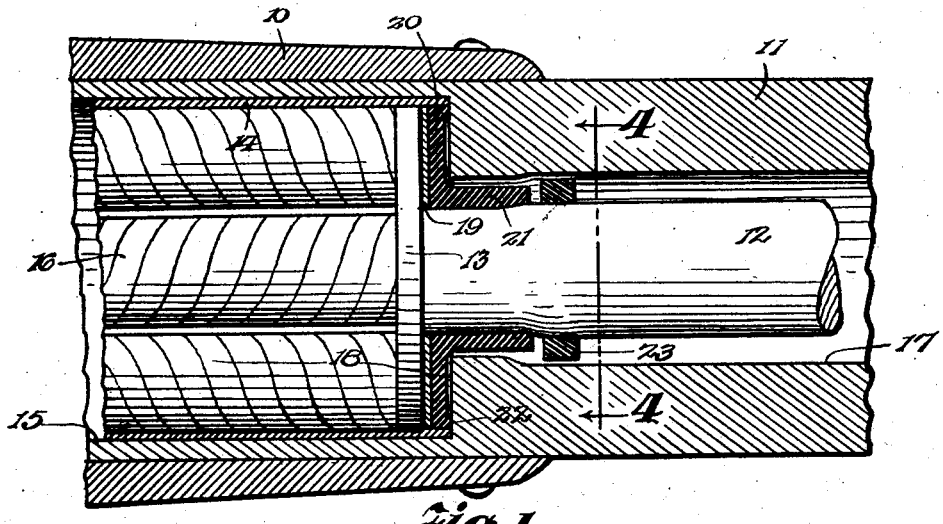
Figure 1 represents a fragmentary axial section of a rear axle housing with the axle shaft and washers in position, the end of the axle near the wheel being shown.
Figure 2:
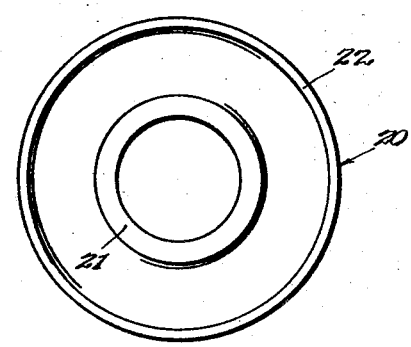
Figure 2 is an end elevation of a collar forming part of the present invention.
Figure 3:
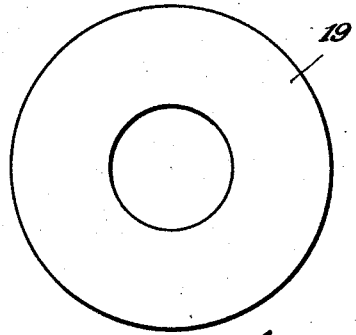
Figure 3 is a similar view of a thin metal washer.
Figure 4:
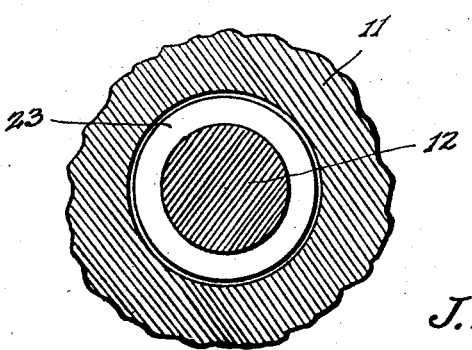
Figure 4 is a transverse section along line 4—4 of Figure 1.

In the drawing, reference numeral 10 represents a gear housing with its tubular extension 11 in which the axle shaft 12 is running. A roller-bearing cage 13 fits snugly in the sleeve 14 carried in the housing 10 in the enlarged bearing chamber 15 for the rollers 16.

A tubular extension 11 of the housing 10, has a bore 17 which is smaller in diameter than the bearing chamber 15, but somewhat greater than the diameter of the axle shaft 12, so that the latter runs freely in this bore. Ordinarily, the cage 13 abuts against the shoulder 18 formed between the chamber 15 and the bore 17; but in the present case, a thin metal washer 19, preferably of the same diameter as the cage 13, together with the packing collar 20, are inserted between the cage 13 and the shoulder 18, as clearly shown in Figure 1. This packing collar has a sleeve portion 21, which fits around the shaft 12, and at the outer periphery of the collar 20 is provided a narrow flange 22 about one thirty-second of an inch high. This packing collar, which is preferably made of hard rubber or some similar material, fits tightly in the roller bearing sleeve 14, so as to be stationary in the housing. The thin metal washer 19 is provided to prevent the cage 13 from injuring the packing collar 20 when the cage turns in the bearing sleeve. It will now be evident that any pressure exerted against the packing collar 20 will cause its narrow flange 22 to be pressed tightly and spread out against the shoulder 18, thus preventing any grease or other lubricant from passing by the packing collar, and retaining the same in the bearing.

Reference numeral 23 represents a hard rubber ring or washer which fits tightly on the axle shaft 12 and, accordingly, turns with the same and has a slightly smaller outside diameter than that of the bore 17. This prevents any grease coming down the shaft from passing the same, thus retaining it in the housing.

It will thus be understood that no grease can be wasted as it is retained in its proper place both by the packing collar 20 and the axle washer 23.

The device just described is shown in connection with an axle and its bearing, as built for Ford automobiles, but it will be clearly understood that the device can be equally well applied to any other type of motor vehicles.

Having thus described the invention, what is claimed as new is:

A structure of the character described comprising a shaft housing formed with a bore having one end portion enlarged to form a bearing chamber having a shoulder at its inner end, a shaft extending axially through the bore of said housing in spaced relation to the walls thereof and through said bearing chamber, anti-friction means in said bearing chamber about said shaft and including an inner disk spaced from said shoulder, a packing disk of compressible material disposed about said shaft and fitted tightly in said chamber between said shoulder and the inner disk of said anti-friction means, an annular axially extending bead about the outer peripheral edge of the inner face of said packing disk and compressed against said shoulder, and a sleeve extending from the inner peripheral edge portion of the inner face of said packing disk and integral therewith and fitted snugly about said shaft but free from frictional binding engagement therewith.

In testimony whereof I affix my signature.

JAMES E. TAYLOR. [L. S.]